(12) United States Patent
Lutzka et al.

(10) Patent No.: US 8,282,160 B2
(45) Date of Patent: Oct. 9, 2012

(54) COMBINATION PIVOT ARMREST AND SEATBACK ASSEMBLY

(75) Inventors: Tavis Lutzka, Davisburg, MI (US); Stephen Bruck, Howell, MI (US)

(73) Assignee: BAE Industries, Inc., Warren, MI (US)

( * ) Notice: Subject to any disclaimer, the term of this patent is extended or adjusted under 35 U.S.C. 154(b) by 371 days.

(21) Appl. No.: 12/643,375

(22) Filed: Dec. 21, 2009

(65) Prior Publication Data

US 2011/0148166 A1 Jun. 23, 2011

(51) Int. Cl.
 *A47C 17/04* (2006.01)
(52) U.S. Cl. ........ 297/113; 297/115; 297/238; 297/254; 297/378.12; 297/411.32
(58) Field of Classification Search ................ 297/113, 297/115, 254, 238, 378.1, 378.12, 378.14, 297/411.2, 411.21, 411.32
See application file for complete search history.

(56) References Cited

U.S. PATENT DOCUMENTS

| | | | | |
|---|---|---|---|---|
| 3,736,026 A * | 5/1973 | Ziegler et al. | ............ | 297/378.14 |
| 4,244,623 A | 1/1981 | Hall et al. | | |
| 4,496,490 A | 1/1985 | Larkin | | |
| 4,621,864 A | 11/1986 | Hill | | |
| 4,946,226 A | 8/1990 | Hurn et al. | | |
| 5,100,202 A * | 3/1992 | Hughes | ..................... | 297/378.11 |
| 5,246,267 A * | 9/1993 | Nagashima et al. | .......... | 297/113 |
| 5,390,980 A * | 2/1995 | Premji et al. | ............. | 297/378.12 |
| 5,425,568 A * | 6/1995 | Sliney et al. | ............. | 297/378.11 |
| 5,658,043 A * | 8/1997 | Davidson | ..................... | 297/113 |
| 5,702,157 A | 12/1997 | Hurite | | |
| 5,873,633 A | 2/1999 | Lang et al. | | |
| 6,047,444 A * | 4/2000 | Braun | ............................. | 16/324 |
| 6,290,297 B1 * | 9/2001 | Yu | ............................. | 297/378.12 |
| 6,467,847 B2 | 10/2002 | Bidare | | |
| 6,471,297 B1 | 10/2002 | Runde et al. | | |
| 6,550,864 B1 * | 4/2003 | Zarna et al. | ............. | 297/378.12 |
| 6,755,474 B2 | 6/2004 | Magnuson | | |
| 6,767,065 B2 | 7/2004 | Heranney | | |
| 7,097,252 B2 * | 8/2006 | Becker et al. | ............ | 297/378.12 |
| 7,284,799 B2 | 10/2007 | Chung | | |
| 7,374,242 B2 * | 5/2008 | Champ et al. | ................. | 297/331 |
| 2008/0303335 A1 | 12/2008 | van de Ven et al. | | |

* cited by examiner

*Primary Examiner* — Laurie Cranmer
(74) *Attorney, Agent, or Firm* — Gifford, Krass, Sprinkle, Anderson & Citkowski, P.C.

(57) ABSTRACT

A combination pivoting armrest and seatback assembly incorporated into a vehicle including a base secured to the vehicle and exhibiting an extending edge profile. A sector is pivotally secured to the base, with a first cam pivotally secured to the sector and contacting a first edge location of the base when the sector is in an upright position. A second cam is also pivotally secured to the sector in inter-engaging fashion with the first cam such that, upon the first cam being rotated out of contact with the base and the sector rotating to a forward dump position, the second cam subsequently contacts a second edge location of the base.

16 Claims, 7 Drawing Sheets

COMBINATION PIVOT ARMREST AND SEATBACK ASSEMBLY

FIELD OF THE INVENTION

The present invention is directed to a pivoting armrest assembly. More specifically, the present invention discloses a front row center armrest incorporating a seatback and which provides third occupant seating when rotated from a downward armrest support position to an upright design position.

BACKGROUND OF THE INVENTION

The present invention discloses a variety of parallel folding and articulating armrest assemblies. The objective of such assemblies is to provide a degree of adjustable ergonomic support as well, as well as in specific instances to provide for rotation between use and non-use positions.

SUMMARY OF THE INVENTION

The present invention recites a combination pivoting armrest and seatback assembly, such as is utilized in a front row hybrid armrest and center seat, and which is incorporated into a vehicle including a base secured to the vehicle and exhibiting an extending edge profile. A sector is pivotally secured to the base, with a first cam pivotally secured to the sector and contacting a first edge location of the base when the sector is in an upright position. A second cam is also pivotally secured to the sector in inter-engaging fashion with the first cam such that, upon the first cam being rotated out of contact with the base and the sector rotating to a forward dump position, the second cam subsequently contacts a second edge location of the base.

Additional features include the first mid second cams each exhibiting opposing arcuate edges exhibiting inter-engaging teeth, the cams each further having extending edge portions for contacting the base respectively in each of the upright and forward dump positions. A lever is pivotally supported upon the sector at an extended location relative to the first and second cams, a cable extending from the lever and contacting the first cam at a location offset from its pivotal connection to the sector.

Other features include a clock spring biasing the second cam in a direction opposite to a pivotal direction induced by the first cam. A reinforcing and supporting bracket is secured to the sector in end extending fashion and to which is pivotally secured the lever. The first cam further exhibits a pin traveling within an arcuate slot defined in the sector and to which the cable is engaged.

A seatback support is mounted to the pivoting sector and, in combination with a second spaced apart and pivotal seatback, supports an overlaying cushioned seatback. The lever further exhibits a finger grasping portion an offset distance from its pivotal connection, as well as a cable supporting portion a further offset and opposite extending distance relative to the pivotal connection.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
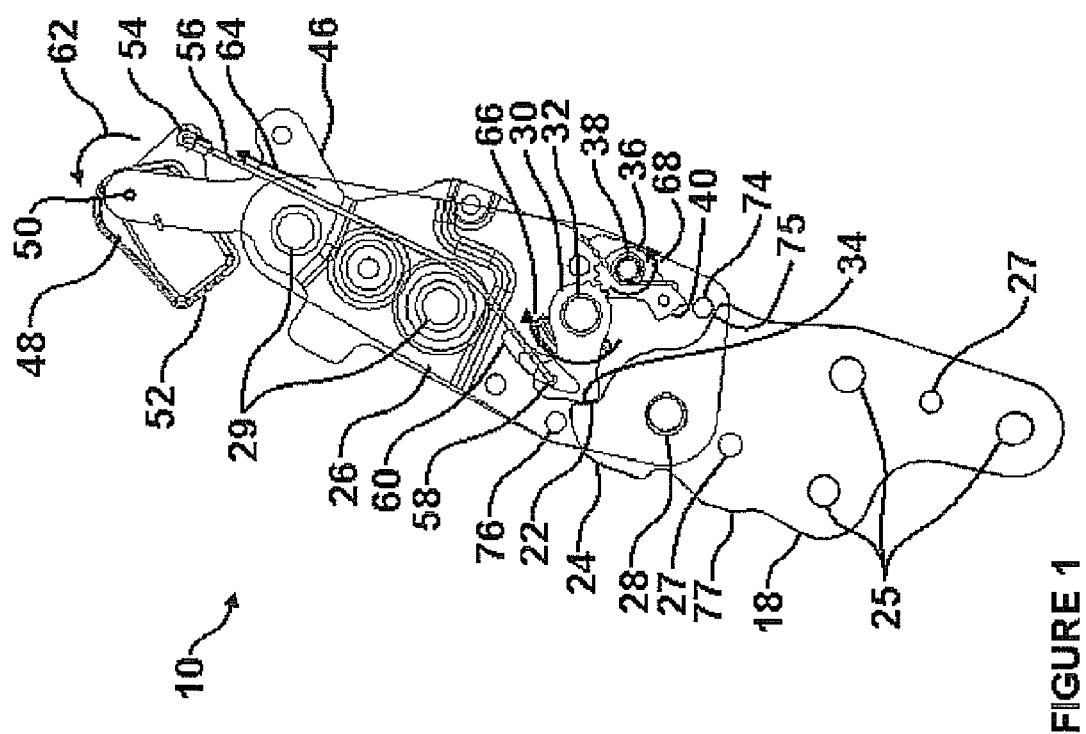
FIG. 1 is a side view of the structural components associated with the armrest including the frame secured base and pivotally secured armrest sector maintained in a first upright and design position via a first interengaging relationship established between first and second cams also pivotally engaged to the armrest sector and abutting an upper surface of the base.
Figure 4:
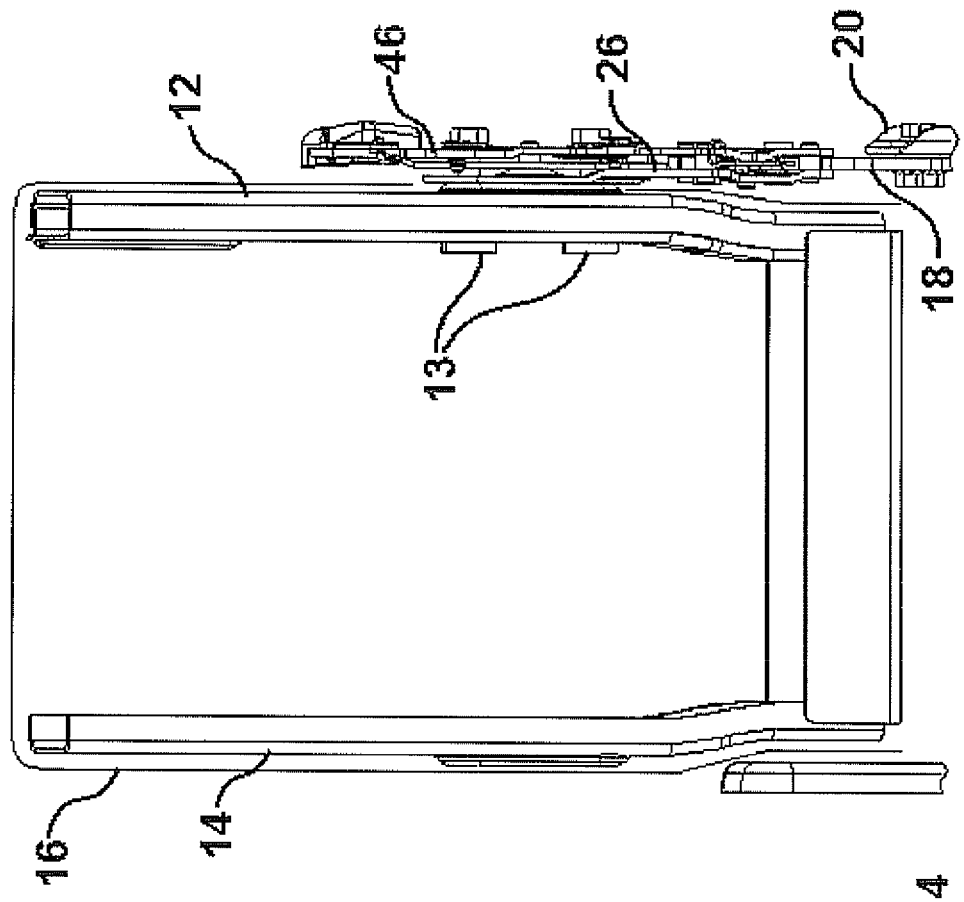
FIG. 4 is front plan view of a third seat incorporating the pivoting armrest and illustrating side extending seatback supports which are affixed to spaced apart and rotating armrest sectors.
Figure 5:
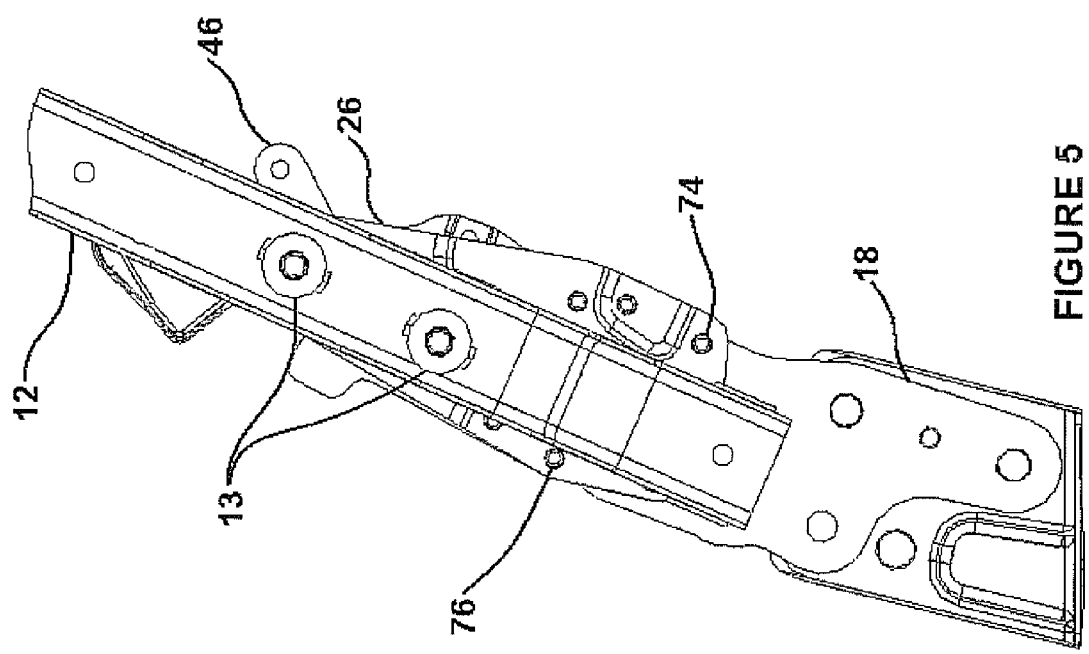
FIG. 5 is a right side view of the third seat shown in FIG. 4.

Referring now to the illustrations, FIG. 1 is a side view is generally illustrated at 10 of the structural components associated with an armrest incorporated into such as a front row center pivotal seatback assembly, this further being illustrated in the plan view shown in FIG. 4 and which includes a first seatback support 12 secured to the pivoting armrest (such as via heavy duty bolt fasteners 13) and which, in combination with a second spaced apart and rotating support 14, collectively supports a cushion 16. As will be further described, the assembly 10 operates in a forward dump position as a front row center armrest and, in a further upwardly rotated and design position, as a center seatback for supporting such as a third passenger in the vehicle front row.

A planar shaped base 18 is secured to such as a frame reinforced floor location (see at 20 in FIG. 4) of the vehicle. As with each of the components associated with the combination assembly, the base is constructed of a high grade steel or like material exhibiting the necessary properties of strength and durability. As further shown in each of FIGS. 1-3, and in which the associated pivotal sector is prevented in partially transparent fashion, the base 18 exhibits an upwardly extending edge profile, in particular including a first side facing location 22 and a second opposite side facing location 24, each of the locations 22 and 24 being located approximate an upper most end of the base 18. The base 18 further exhibits individual pluralities of apertures, as representatively shown at 25 and 27, these facilitating mounting of the base 18 to the frame 20.

Figure 2:
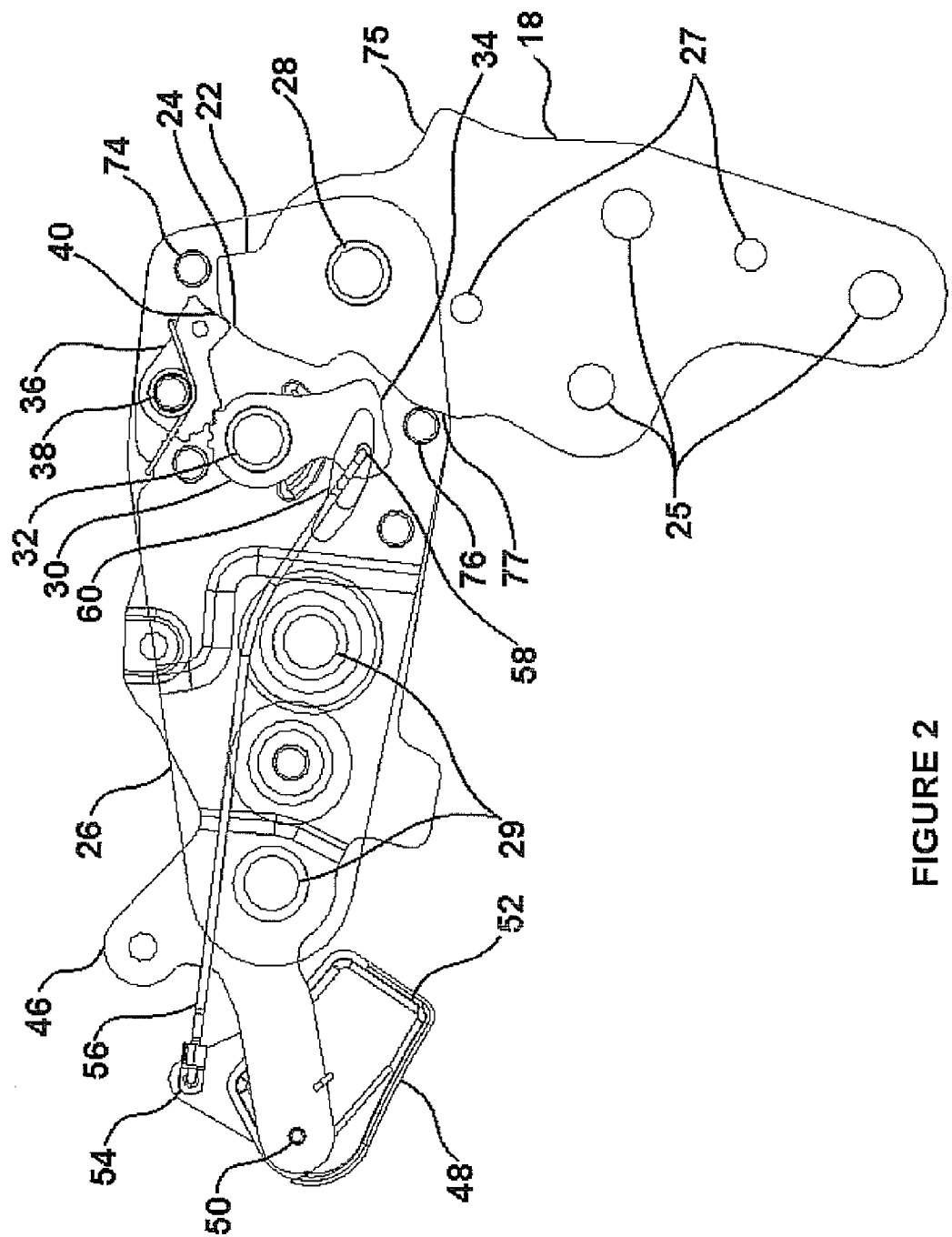
FIG. 2 is a succeeding side view and illustrating an inter-rotated relationship between the first and second cams for causing the armrest sector to forwardly dump relative to the base and for a selected cam to engaged a further surface location of the base in the dump position.
Figure 3:
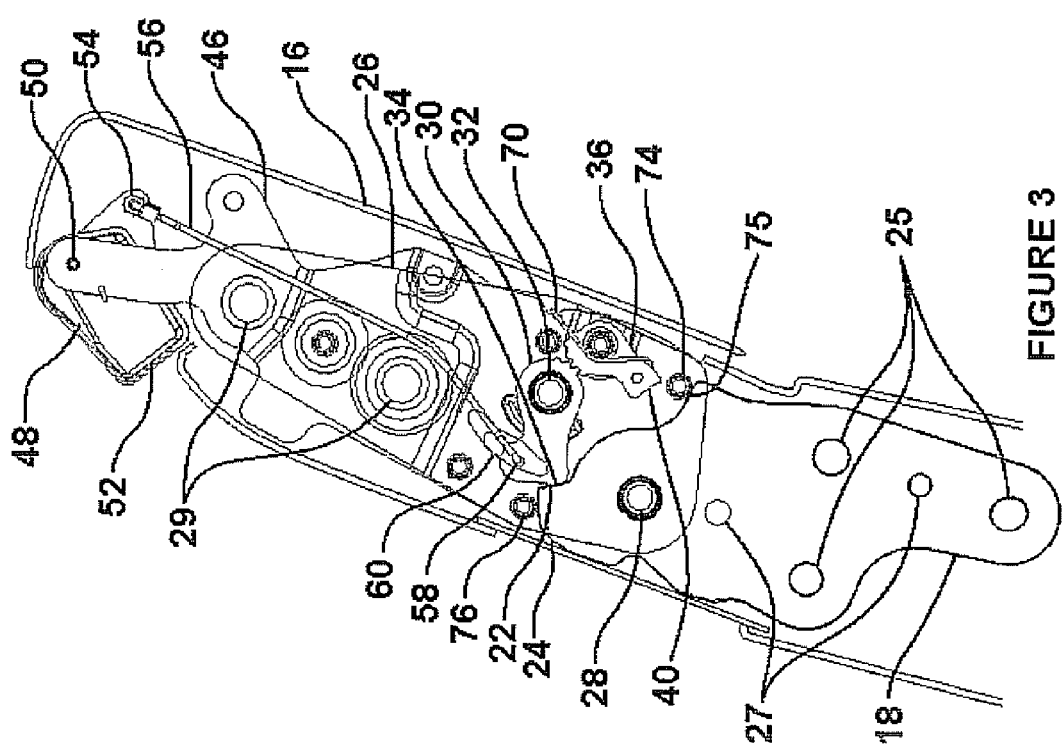
FIG. 3 is an illustration similar to FIG. 1 and showing in phantom an outline covering surrounding the armrest and providing access to an end disposed and rotatable triggering handle, as well as illustrating a clockwise biased cam associated with the second interengaging cam.

An armrest sector 26 is provided and, similar to the base 18, exhibits a generally planar and elongated shape. The sector 26 is pivotally secured to the base 18 by pivot pin 28 and so that, as illustrated, the sector 26 is capable of being rotated between a generally upright and design position (see FIG. 1) and a forwardly rotated and dump position (FIG. 2). As further shown, additional spaced apertures 29 are provided for mounting thereto the seatback support 12 to the rotating armrest sector 26 in the manner shown.

A first cam is shown at 30 and is pivotally secured, at 32, to an inside surface of the sector 26 such that an extending edge portion 34 opposes and contacts (in the upright design position of FIG. 1) the first side facing location 22 associated with the base 18. A second cam 36 is further pivotally secured, at 38, to a further location of the sector 26. The second earn 36 is inter-engaged to the first cam 30 and such that an extending edge portion 40 contacts the second side facing location 24 of the planar base extending edge.

Figure 6:
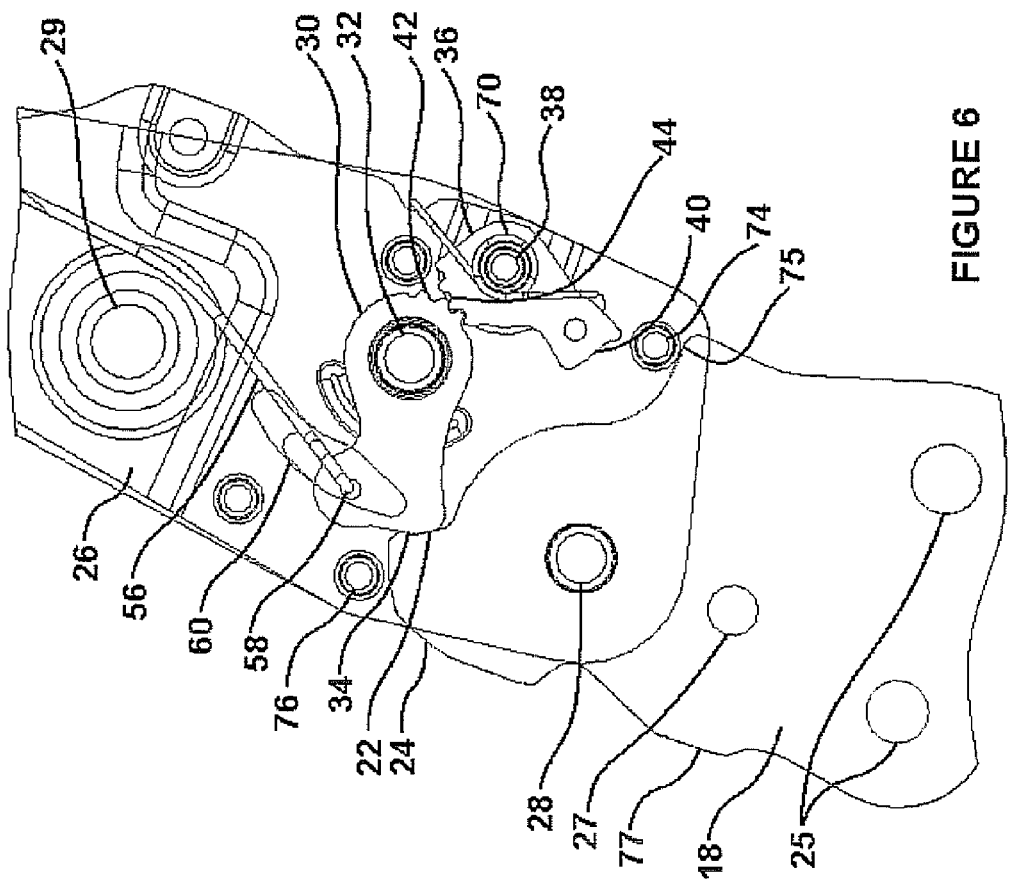
FIG. 6 is an enlarged sectional view of the armrest as shown in FIG. 1 and illustrating the first and second rotating cams in a first engaged arrangement with the upright armrest sector and pivotally supporting base.
Figure 7:
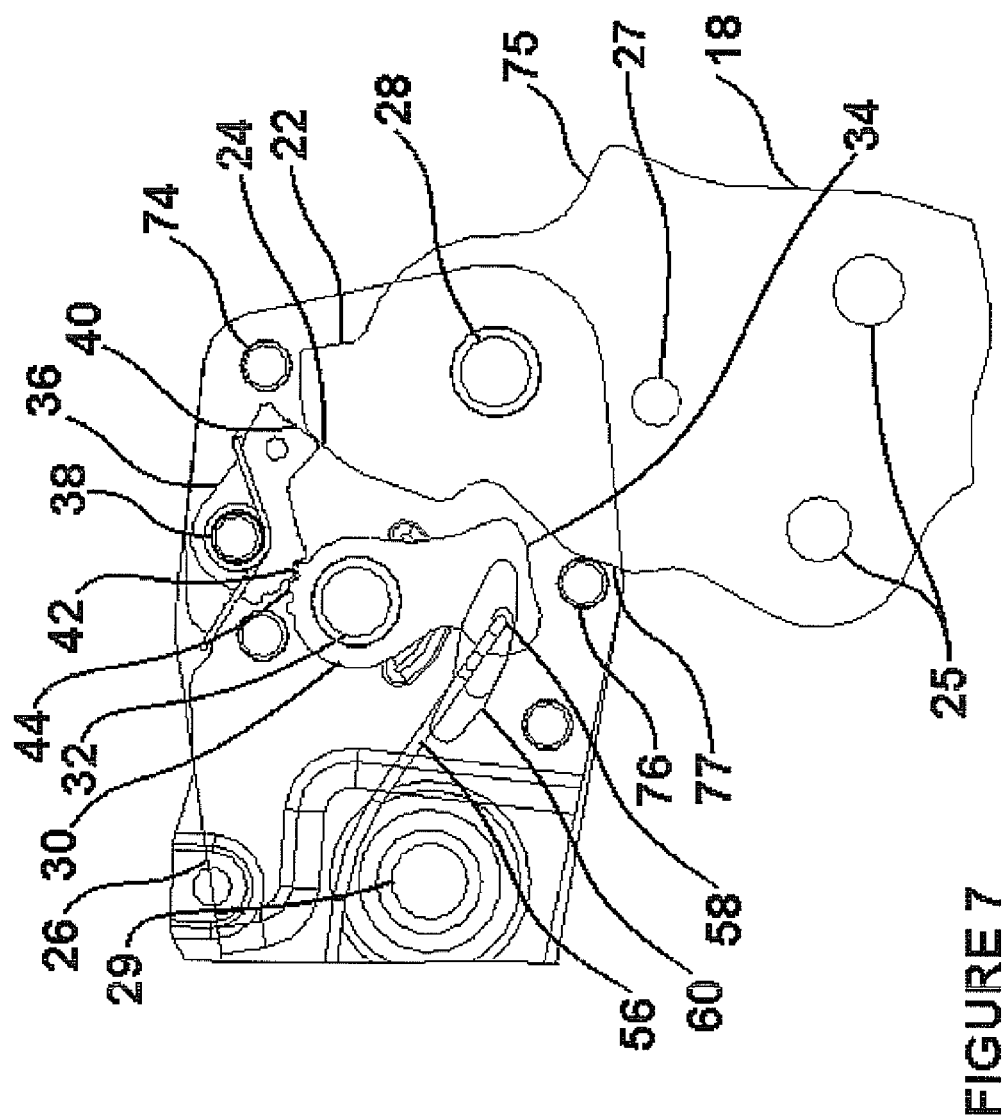
FIG. 7 is a corresponding enlarged sectional view of the armrest shown in FIG. 2 and illustrating the cams in their inter-rotated second positions for engaging the forwardly dumped armrest sector to the further location of the base.

As further concurrently shown in the enlarged sectional views of FIGS. 6 and 7 (these corresponding to FIGS. 1 and 2) the first 30 and second 36 cams each further exhibit an opposing arcuate edge which includes a plurality of inter-meshing teeth. Reference in particular is shown in FIGS. 6 and 7 to each of teeth 42 associated with first cam 30 and meshing teeth 44 associated with second cam 36.

A bracket 46 is secured to the sector 26 in generally planar and end extending fashion. A lever 48 is pivotally secured at 50 to an upper projecting edge of the bracket 46 (with the lever alternatively being secured directly to the sector 26 in instances in which the bracket is 46 is removed). The lever 48 exhibits a finger grasping portion 52 an offset distance from the pivot connection 50, with a cable supporting portion 54 a further offset and opposite extending distance.

A cable 56 extends from the lever supporting portion 54 to an opposite end in which it engages a pin 58 associated with the first can 30 at a location offset from its pivotal connection 32 to the sector 26. An arcuate slot 60 is defined in the sector 26 in an aligned location through which the pin 58 seats and so that, upon rotating the lever 48 in a clockwise (cw) direction as noted by arrow 62 in FIG. 1, the cable 56 is caused to linearly extend in an outward direction further evidenced by arrow 64.

At this point, the opposite end of the cable 56 causes the pin 58 to displace along slot 60, thereby pivoting the first cam 30 in a clockwise direction 66 about pivot point 32. Due to the inter-meshing teeth established between the cams, the second cam 36 is caused to pivot in a counterclockwise (ccw) direction, see arrow 68. The rotating force imparted on the second cam 36 is opposed by a clock spring 70 (see FIGS. 3 and 6) which biases the second cam 36 in a clockwise (cw) direction in opposition to the pivotal direction 66 induced by the first cam 30.

In this fashion, the edge portion 34 of the first cam 30 is caused to pivot out of engagement with the first (upright design) supporting location 22 of the fixed base 18 and so that a biasing force (such as associated with a further clock spring 72 representatively shown in FIG. 7 arranged at the pivot location 28) causes the sector 26 to rotate to a forward dump location at which the extending portion 30 of the second cam 36 is brought into contact with the further (second) edge location 24 of the base 18.

A first pin 74 extends from a generally lower edge location of the sector 26 in such a fashion that it contacts a first lower extending edge location 75 (located on the generally same facing side as the upper location 22) of the base 18 in the upright design position of FIG. 1. A second pin 76 extends from a forward location of the base 18 at a position generally above the first pin 74 and so that, upon rotating the sector 26 to the dump position of FIG. 2, contacts a further extending edge location 77 (likewise on a generally same facing side as upper location 24) of the base 18 and in order to support the abutting engagement alternately established by the cams 30 and 36.

In this fashion, the armrest/seatback establishes a locking engagement in either of the upright/design or forward rotated/dumped positions. As is further understood, reverse upright movement of the sector 26 (from the position of FIG. 2) is accomplished by again actuating the lever 48, at which point the engaging portion 40 of the second cam 36 is rotated out of contact with the base location 24 and the sector 26 is reverse/upright rotated against the force of the biasing spring 72 until such time as the extending portion 34 associated with the first cam 30 re-engages the upright design support position 22 of the base 18 (and the pin 74 engages the lower established abutment location 75).

In this fashion, the construction of the combination armrest/seatback provides both buzz, squeak and rattle prevention during the handling of mandated ABTS loads associated with a functioning seatback. Additional embodiments contemplated by the present invention include the pivoting armrest capable of functioning without provision of an extending seatback frame support, such as in the instance of a reduced sized armrest forming a component of a modified center console not incorporating a center seat. It is also envisioned that the two cam arrangement can also be substituted for a modified/reconfigured single cam, such as exhibiting plural engagement surfaces for contacting both upright design and forward dump locations associated with the base.

Having described my invention, other and additional preferred embodiments will become apparent to those skilled in the art to which it pertains and without deviating from the scope of the appended claims.

We claim:

1. A combination pivoting armrest and seatback assembly incorporated into a vehicle and comprising:
    a base secured to the vehicle and exhibiting an extending edge profile;
    a sector pivotally secured to said base;
    a first cam pivotally secured to said sector and contacting a first edge location of said base when said sector is in an upright position; and
    a second cam pivotally secured to said sector in inter-engaging fashion with said first cam, said first and second cams each further comprising opposing arcuate edges exhibiting inter-meshing teeth such that, upon said first cam being rotated out of contact with said base and said sector rotating to a forward dump position, said second cam subsequently contacting a second edge location of said base.

2. The invention as described in claim 1, said first and second cams each further comprising extending edge portions for contacting said base respectively in said upright and forward dump positions.

3. The invention as described in claim 1, further comprising a seatback support mounted to said sector.

4. The invention as described in claim 3, further comprising a second spaced apart and pivotal seatback support which, in combination with said sector mounted seatback support, supports an overlaying cushioned seatback.

5. A pivoting armrest assembly incorporated into a center front row seat of a vehicle and comprising:
    a base secured to the vehicle and exhibiting an extending edge profile;
    a sector pivotally secured to said base;
    a first cam pivotally secured to said sector and contacting a first edge location of said base when said sector is in an upright position;
    a second cam pivotally secured to said sector in inter-engaging fashion with said first cam, said first and second cams each further comprising opposing arcuate edges exhibiting inter-meshing teeth;
a lever pivotally supported upon said sector at an extended location relative to said first and second cams; and
a cable extending from said lever and contacting said first cam at a location offset from its pivotal connection to said sector such that, upon said first cam being rotated out of contact with said base and said sector rotating to a forward dump position, said second cam subsequently contacting a second edge location of said base.

6. The invention as described in claim 5, said first and second cams each further comprising extending edge portions for contacting said base respectively in said upright and forward dump positions.

7. The invention as described in claim 5, further comprising a clock spring biasing said second cam in a direction opposite to a pivotal direction induced by said first cam.

8. The invention as described in claim 5, further comprising a bracket secured to said sector in end extending fashion and to which is pivotally secured said lever.

9. The invention as described in claim 5, said first cam further comprising a pin traveling within an arcuate slot defined in said sector and to which said cable is engaged.

10. The invention as described in claim 5, further comprising a seatback support mounted to said sector.

11. The invention as described in claim 10, further comprising a second spaced apart and pivotal seatback support which, in combination with said sector mounted seatback support, supports an overlaying cushioned seatback.

12. The invention as described in claim 5, said lever further comprising a finger grasping portion an offset distance from said pivotal connection and a cable supporting portion at an opposite offset extending distance.

13. A combination pivoting armrest and seatback assembly incorporated into a vehicle and comprising:
a base secured to the vehicle and exhibiting an extending edge profile;
a sector pivotally secured to said base;
a first cam pivotally secured to said sector and contacting a first edge location of said base when said sector is in an upright position;
a second cam pivotally secured to said sector in inter-engaging fashion with said first cam such that, upon said first cam being rotated out of contact with said base and said sector rotating to a forward dump position, said second cam subsequently contacting a second edge location of said base; and
a lever pivotally supported upon said sector at an extended location relative to said first and second cams, a cable extending from said lever and contacting said first cam at a location offset from its pivotal connection to said sector, a bracket secured to said sector in end extending fashion and to which is pivotally secured said lever.

14. The invention as described in claim 13, further comprising a clock spring biasing said second cam in a direction opposite to a pivotal direction induced by said first cam.

15. The invention as described in claim 13, said lever further comprising a finger grasping portion an offset distance from said pivotal connection and a cable supporting portion at an opposite offset extending distance.

16. A combination pivoting armrest and seatback assembly incorporated into a vehicle and comprising:
a base secured to the vehicle and exhibiting an extending edge profile;
a sector pivotally secured to said base;
a first cam pivotally secured to said sector and contacting a first edge location of said base when said sector is in an upright position;
a second cam pivotally secured to said sector in inter-engaging fashion with said first cam such that, upon said first cam being rotated out of contact with said base and said sector rotating to a forward dump position, said second cam subsequently contacting a second edge location of said base; and
a lever pivotally supported upon said sector at an extended location relative to said first and second cams, a cable extending from said lever and contacting said first cam at a location offset from its pivotal connection to said sector, said first cam further comprising a pin traveling within an arcuate slot defined in said sector and to which said cable is engaged.

* * * * *